United States Patent

Freer

[15] 3,676,934
[45] July 18, 1972

[54] PRECISION DIGITAL LINEAR ADJUSTMENT MECHANISM AND HEIGHT GAGE EMBODYING SAME

[72] Inventor: Edgar P. Freer, Canoga Park, Calif.
[73] Assignee: Hubach-Freer Corporation, Los Angeles, Calif.
[22] Filed: March 13, 1970
[21] Appl. No.: 19,207

[52] U.S. Cl. .......................................................33/169 R
[51] Int. Cl. ..........................................................G01b 3/22
[58] Field of Search..............................33/168 B, 170, 169 R

[56] References Cited

UNITED STATES PATENTS 2,700,826   2/1955   Rifner..................................33/169 R

FOREIGN PATENTS OR APPLICATIONS 546,157     6/1942   Great Britain............................33/170
1,055,992   1/1967   Great Britain..........................33/168 B
582,943    12/1946   Great Britain..........................33/169 R

*Primary Examiner*—Harry N. Haroian
*Attorney*—Allan M. Shapiro

[57] ABSTRACT

A precision digital adjustment mechanism for a linear distance gaging device having a pair of gage members connected for relative movement along a direction line normal to parallel gaging surfaces on the members. The digital adjustment mechanism employs a number of accurately calibrated gage pins of graduated length mounted in holding means which are adjustable to locate selected combinations of the gage pins in gaging positions, the selected gage pins precisely establish the spacing between the gaging surfaces. A height gage embodying the digital adjustment mechanism.

14 Claims, 5 Drawing Figures

Patented July 18, 1972

EDGAR P. FREER
INVENTOR.

BY

ATTORNEY

Patented July 18, 1972

EDGAR P. FREER
INVENTOR.

BY

ATTORNEY 3,676,934

PRECISION DIGITAL LINEAR ADJUSTMENT MECHANISM AND HEIGHT GAGE EMBODYING SAME

BACKGROUND OF THE INVENTION

1. Field of the Invention

This invention relates generally to linear distance gaging instruments and more particularly to a novel precision digital linear adjustment mechanism for such instruments. A preferred embodiment of the invention contemplates a height gage incorporating the digital adjustment mechanism.

2. Prior Art

This invention is concerned with a novel digital linear adjustment mechanism which may be utilized in a variety of linear distance gaging instruments for the purpose of measuring the distance between a pair of gaging surfaces or establishing a desired spacing between such surfaces. The precision height gage provides a particularly useful application of the digital adjustment mechanism. For this reason, the invention will be described in connection with its use in such a device.

Essentially a height gage consists of a stationary gage member or base having a lower gaging surface, a vertically adjustable gage member carrying an upper gaging surface, and means for adjusting the height of the upper gaging surface relative to the lower gaging surface and hence to the reference surface on which the gage rests. Prior art height gages commonly employ one of two means for adjusting the height of the upper gaging surface. Some, for example the gage as illustrated in FIG. 3 of U.S. Pat. No. 3,295,217, utilize a set of gage blocks to establish the desired adjustment. Such gages are effective only to make measurements relative to a single predetermined setting. Each time this setting is to be changed a new combination of gage blocks must be selected and the instrument readjusted to conform to that combination. This process is time consuming and subject to error in the selection of the gage blocks making up the new combination.

Other height gages, such as that illustrated in FIG. 2 of the above mentioned patent and in U.S. Pat. No. 2,766,531 have an internal dimensional reference and are more readily adjustable. However, the internal reference in these instruments is a micrometer or similar mechanism employing a threaded screw which is an analogue device, not a digital device, and is subject to backlash, setting, and reading errors.

SUMMARY OF THE INVENTION

The present invention provides a novel digital linear adjustment mechanism for gaging instruments having a pair of gaging members which are connected for relative movement along a direction line normal to gaging surfaces on the members to adjust the spacing between these surfaces. The gage members are provided with a pair of abutments located on a common axis lying parallel to the direction line of relative movement of the members. Adjustable holding means containing a number of accurately calibrated gage pins of different lengths are mounted on one gage member. These holding means are adjustable to selectively locate the gage pins in gaging position between the gage abutments. When in gaging position, the gage pins are disposed endwise between and along the common axis of the gage abutments in such a way as to establish a precise predetermined spacing between the abutments and hence between the gaging surfaces. This gage surface spacing may be adjusted readily by moving the gage pin holding means to position any desired combination of gage pins between the opposed abutments. A feature of the invention resides in the unique arrangement of the digital adjustment mechanism whereby the gage pin holding means may be adjusted easily, quickly and accurately to move the gage pins into and out of gaging position.

One of the gaging members is firmly mounted to stand upright on a base. The other gaging member carries a vertical gage bar having a number of horizontal gaging surfaces uniformly spaced along a vertical edge of the bar. In a typical height gage according to the invention, the uniform spacing, referred to herein as unit spacing, between these gaging surfaces is one inch. The gage pins of the height gage are accurately machined or formed to differ in length by selected decimal fractions of the gage surface unit. With this arrangement the height gage can be used to establish any desired height, or to measure the height of a given object, by merely selecting one of the unit gaging surfaces and setting the digital adjustment mechanism.

DESCRIPTION OF THE PREFERRED EMBODIMENT

Figures 1, 2:
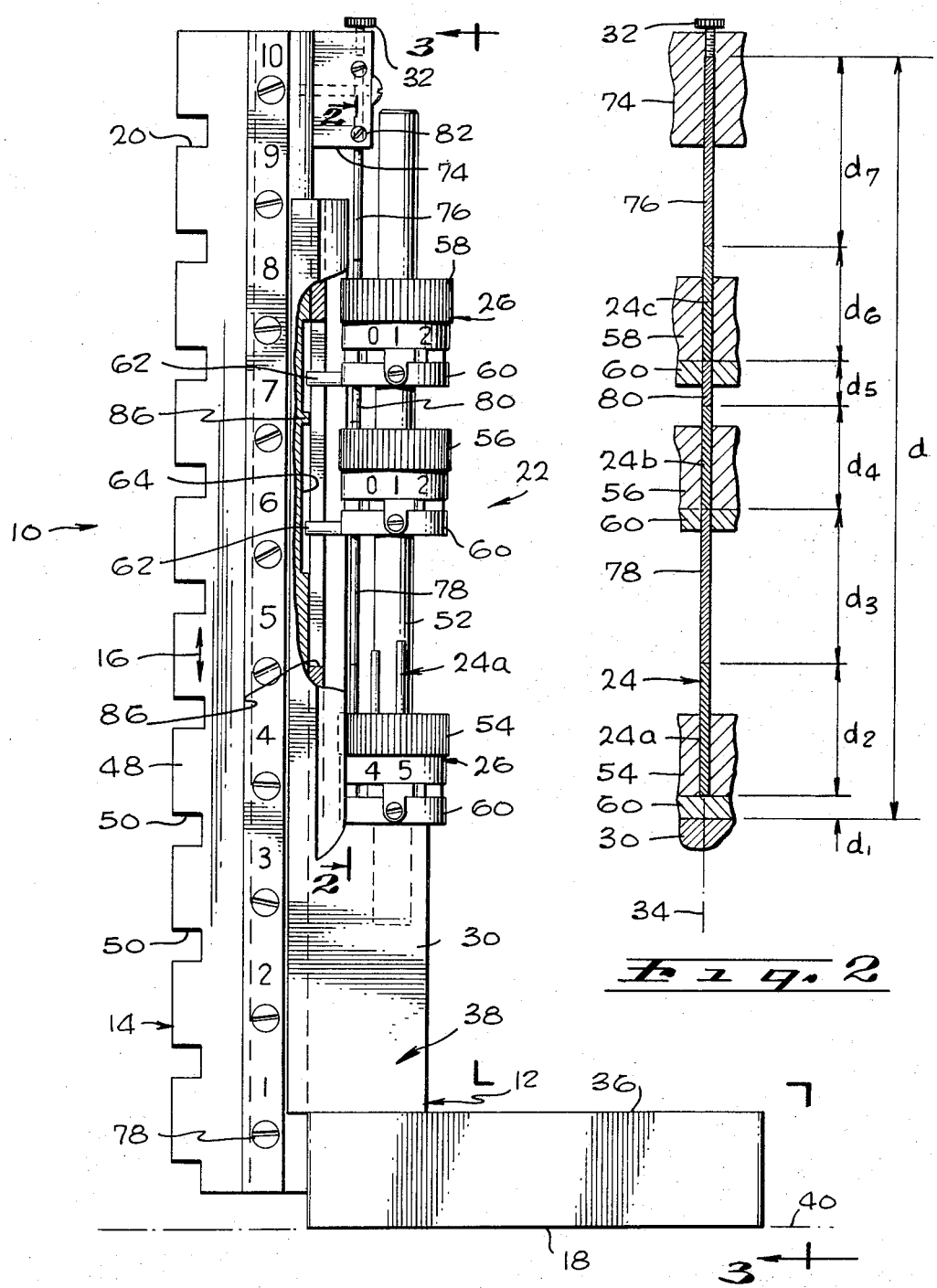
FIG. 1 is a side elevation of a height gage according to the invention with parts broken away for the sake of clarity.
FIG. 2 is an enlarged section taken on line 2—2 in FIG. 1.
Figure 4:
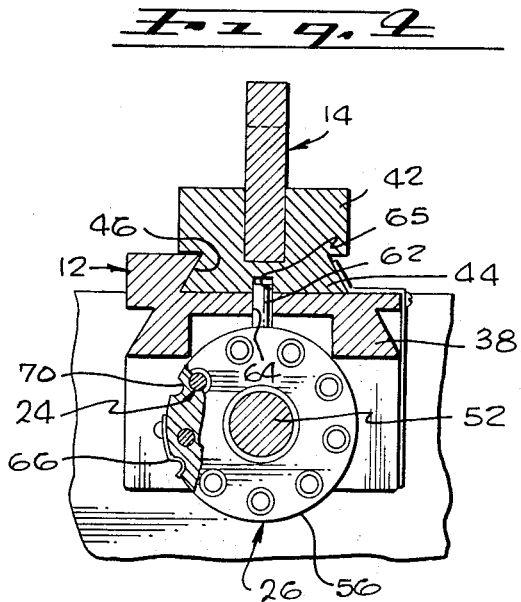
FIG. 4 is an enlarged section taken on line 4—4 in FIG. 3.
Figure 3:
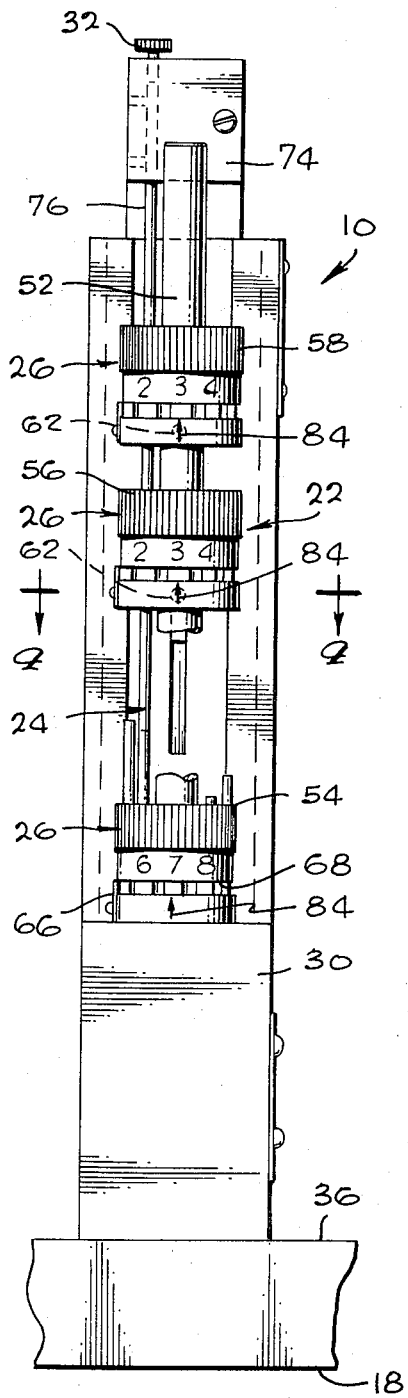
FIG. 3 is an elevational view of the height gage looking in the direction of the arrows on line 3—3 in FIG. 1.
Figure 5:
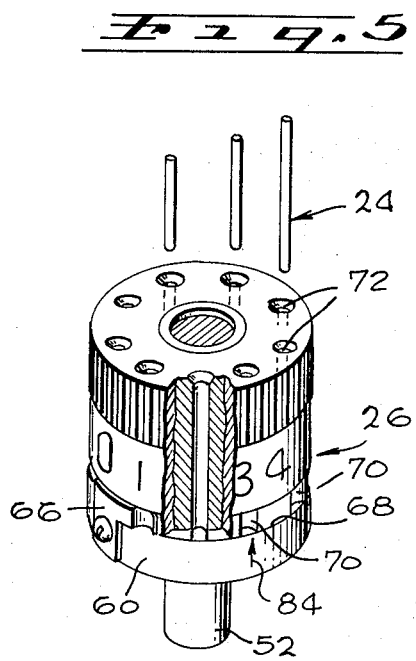
FIG. 5 is an enlarged perspective view of one gage pin holder of the height gage of FIG. 1.

Referring to the drawings, height gage 10 has a pair of gage members 12 and 14 mutually connected for relative movement along a direction line 16 normal to gaging surfaces 18 and 20 on the gage members, respectively, and a digital adjustment mechanism 22 according to the invention operatively interposed between the gage members for effecting precise digital adjustment of the members along the direction line 16.

The digital adjustment mechanism 22 includes a number of precision gage pins (designated generally by the numeral 24) of accurately calibrated length. Gage pins 24 are supported in holding means 26. These holding means are adjustable to selectively locate the gage pins in gaging position between a pair of abutments 30 and 32 on the gage members 12, 14, respectively. These gage abutments are situated on a common axis 34 parallel to the direction line 16. When in gaging position, each gage pin 24 is disposed endwise between the gage abutments 30, 32 on their common axis 34 to positively space the abutments and thereby also the gaging surfaces 18, 20. One of the abutments, in this case the upper abutment 32, is adjustable along the axis 34 to adjust the relative positions of the gage members 12, 14 along their direction line 16 independently of the digital adjustment mechanism 22.

Gage member 12 provides a lower relatively stationary member or base of the height gage. This base includes a base plate 36 and guide 38 rising vertically from the base plate. Gaging surface 18 provides a base surface on the base plate 36 for resting on a reference surface 40, such as a work table.

In the present embodiment of the invention upper gage member 14 is the moveable member and includes a slide 42. Along one side of slide 42 is a dovetail tongue 44 which slides in a mating channel 46 in the base guide 38. Fixed to and extending lengthwise of the slide 42 is a gage bar or plate 48 having gaps or slots 50 defining the gaging surfaces 20. As will appear presently, these gaging surfaces are uniformly spaced a given unit distance, such as one inch, along the gage plate 48. It will now be understood that the upper gage member 14 is moveable vertically relative to the lower gage member or base 12 to vary the height of all of the gaging surfaces 20 above the reference surface 40.

The digital linear adjustment mechanism 22 of the invention comprises a shaft 52 parallel to and laterally spaced from the gage abutment axis 34. At the lower end of the shaft 52 is an integral enlargement on the rear of the upright base guide 38 which forms the lower gage abutment 30. The shaft rises vertically from the abutment to a height slightly above the upper end of the base guide 38.

The gage pin holding means 26 of the present digital adjustment mechanism 22 comprise three rotary gage pin holders or thimbals 54, 56, 58. These thimbals are arranged one over the other on the shaft 52. Each thimbal is freely rotatable on the shaft. At least the two upper thimbals 56, 58 are also freely slidable along the shaft.

Mounted on the shaft 52 below each thimbal 54, 56, 58 is a collar-like thimbal support 60. The thimbal support 60 associated with thimbal 54 may be fixed on the shaft in seeking contact with the upper face of the lower abutment 30. The two upper thimbal supports 60 are slidable along the shaft. These latter two supports are restrained against turning the shaft by pins or keys 62 which project radially from the supports 60, through a longitudinal groove or keyway 64 in the base guide 38, into a longitudinal groove or keyway 65 in the slide tongue 44.

Each gage pin thimbal 54, 56, 58, and its adjacent collar support 60 are joined by position retaining means such as generally "L"-shaped indexing spring detents 66. Each detent 66 is fixed at its lower end to the adjacent thimbal support. The upper end of each detent 66 curves circumferentially about the adjacent thimbal. Formed in the bottom wall of each thimbal groove 68 are indexing detents 70 to yieldably retain the gage pin thimbals 54, 56, 58 in corresponding angular positions relative to the base guide 38. Extending through each thimbal 54, 56, 58 parallel to and at a uniform center distance from the thimbal axis are a number of bores 72. These bores are sized to slidably receive gage pins 24 and are uniformly spaced about each thimbal, as shown.

Bolted to the rear side of the upper end of the gage slide 14 is an abutment bar 74. The upper gage abutment 32 is a screw threaded in the upper end of a bore extending through the bar 74 on the abutment axis 34. Slidably fitted within the lower end of this bore is a push rod 76. The upper end of this push rod seats against the lower end of the adjustment screw 32. Fixed to and depending below the two upper thimbal support collars 60 are push rods 78 and 80. The several push rods 76, 78, 80 are co-axially aligned on the abutment axis 34.

From the description of this point, it is evident that rotation of each thimbal 54, 56, 58 effects rotation of its respective gage pins 24 in succession through a position of co-axiAl alignment with the common abutment-push rod axis 34. This position of the gage pins is the gaging position referred to earlier. The angular position occupied by each thimbal 54, 56, 58 when its gage pins 24 occupy their respective positions are hereafter referred to as index positions. The thimbal detents 66 and recesses 70 are arranged to locate and yieldably retain the thimbals in these index positions.

Referring to FIG. 2, it will be observed that rotating the thimbals 54, 56, 58 to given index positions and allowing the push rods 76, 78, and 80 to rest on the gage pins 24 lying along abutment axis 34, establishes a fixed spacing between the gage abutment 30, 32 and thereby locates each gaging surface 20 of the gage slide 14 at a fixed height above the gage base surface 18. The abutment spacing equals the sum of the lower thimbal support thickness $d_1$, the lower gage pin length $d_2$, the lower push rod length $d_3$, the intermediate gage pin length $d_4$, the intermediate push rod length $d_5$, the upper gage pin length $d_6$, and the upper push rod length $d_7$.

The height gage employs two height adjustment for setting the gage slide 14 relative to the gage base 12 and hence the height of each gaging surface 20 above the base surface 18 and reference surface 40. One of these adjustments is an analogue 0 setting adjustment involving rotation of the adjustment screw 32 to shift the slide 14 vertically without altering the abutment spacing $d$. The other height adjustment is a digital gaging adjustment involving selective rotation of the thimbals 54, 56, 58 to locate different gage pins 24 in gaging position without altering the setting of the zero adjustment screw 32. With regard to the zero setting height adjustment, it is evident that rotation of the zero adjustment screw 32 moves the screw and the upper push rod 76 along the push rod axis 34 relative to the gage slide 14. This push rod adjustment moves the slide vertically relative to the gage base 12 independently of the gage abutment spacing $d$. As will appear presently, this zero adjustment is made at the outset of a gaging operation and then fixed by tightening set screws 82 against the upper push rod 76 to secure the latter in fixed position relative to the slide.

The digital height adjustment accomplished by selective rotation of the thimbals 54, 56, 58 is utilized during normal gaging use of the height gage to effect precise vertical positioning of the gaging surfaces 20 on the gage slide 14 relative to the gage base surface 12 and hence to the reference surface 40. In this regard, it is significant to recall that the gaging surfaces 20 are spaced along the gage bar 48 with a precise uniform unit spacing. This precise unit spacing of the gaging surfaces may be accomplished by utilizing a one-piece metal gage bar in which the slots 50 are accurately machined at the proper unit spacing to define the gaging surfaces 20. The gage bar will be appropriately case hardened to resist wear. Alternatively, the gage bar may comprise a number of precision gage blocks stacked one on top of the other along the slide. These gage blocks will be secured to the slide in any convenient manner and will be appropriately sized and shaped to define the gaging surfaces 20.

Gage pins 24 are case hardened pins which are accurately calibrated to have different precise lengths, such that the gage abutment spacing d, and hence the height of each gaging surface 20 above the gage base surface 18, may be digitally adjusted in precise predetermined steps equivalent to selected digital increments of the unit spacing between the adjacent gaging surfaces 20. In a typical height gage according to the invention, for example, the gaging surfaces 20 have a uniform unit spacing of one inch, and the gage pins 24 are machined to provide a total digital adjustment of one inch in precise 1/10, 1/100, and 1/1000 inch increments or steps. To this end, thimbal 54 carries a set 24a of ten gage pins which progressively increase in length, from the shortest pin to the longest pin, in precise 1/10 inch steps. That is to say, each gage pin in the set is 1/10 inch longer than the preceding shorter pin and 1/10 inch shorter than the next longer pin. Simiarly, thimbals 56 and 58 carry sets 24b, 24c of ten gage pins each which progressively increase in length 1/100 and 1/100 inch steps, respectively.

For convenience in the ensuing description, the difference in length of successive gage pins and each pin set 24a, 24b, 24c is referred to as the digital increment of the pin set, the decimal length of the digital increment of each pin set is referred to as the decimal order of the set, and the difference between the length of the shortest gage pin in each pin set and the length of any selected pin of the set, expressed in terms of the number of digital increments of the pin set in the length difference, is referred to as the gaging number, or simply number, of the selected pin. Finally, the difference between the length of the shortest pin in each pin set and the length of any selected pin, expressed in inches, is referred to as the effective gaging length, or simply effective length of the selected pin.

From the foregoing description, it will be understood that successive gage pins 24 in each gage pin set 24a, 24b, 24c differ in length by one digital increment and have gaging numbers of zero, one, two . . . nine, respectively. The decimal orders of the pin set 24a, 24b, 24c are 1/10, 1/100, and 1/1000, respectively. The effective gaging length of any gage pin equals the product of its gaging number and the decimal order of its pin set. For example, the shortest pin in pin set 24a has an effective length of (zero) (1/10) or zero inches, as does the shortest pin in each pin set 24b, 24c. The third shortest pin in gage pin set 24b, i.e., pin No. 2, has an effective length of (two) (1/100) or 0.02 inches, and so on.

Each thimbal 54, 56, 58 is marked to indicate the decimal order of its respective gage pin set. Also, about the circumferences of each thimbal are the numbers zero through nine representing the gaging numbers of the corresponding gage pins. These numbers are arranged about each thimbal in a manner such that each number registers with a reference dart 84 on the adjacent thimbal support collar 60 when its corresponding gage pin is in gaging position. In the ensuing description, each gage pin is referred to by its gaging number. Also, the index positions of the thimbals 54, 56, 58 are referred to by the number of their corresponding gage pins, i.e., the number two index position of any thimbal is the position in which its number two gage pin is located in gaging position. Along the gage bar 48 are numbers representing the height of each gaging surface 20 above the lower end face of the bar. For example, the number 5 indicates that the corresponding gaging surface is five inches above the lower end of the gaging bar.

In a normal upright gaging position of the height gage 10, the gage pins 24 currently in gaging position and the push rods 76, 78, 80 are disposed in end to end load supporting contact along the common axis 34 to vertically support to slide 14 at its corresponding gaging height. Rotation of the thimbals 54, 56, 58 from one index position to another thus requires axial separation of the gage pins and push rods.

To this end, the keyway or groove 65 in the gage slide 14 which receives the thimbal support keys 62 has shoulders 86 arranged at intervals along its length. These shoulders are spaced to contact the thimbal support keys 62 when the gage slide 14 is elevated by hand relative to the gage base 12 in such a way as to raise the thimbal support collar 60 along the supporting shaft 52 with a sequential lost motion action such that the lower push rod 78 is elevated out of contact with the lower gage pin 24a currently in gaging position, the center push rod 80 is elevated out of contact with the center gage pin 24b currently in gaging position, and the upper push rod 76 is elevated out of contact with the upper gage pin 24c currently in gaging position. In this regard, it is significant to recall that at this time the upper gage pin 76 is firmly secured to the slide 14 by the set screws 82.

Before the height gage 10 is placed in use, and preferably at the time of manufacture, as one of the last steps in its final assembly, the instrument is calibrated on a reference surface. With the base surface 18 resting flat on the reference surface 40, the gage slide 14 is raised by hand relative to the gage base 12, and the thimbals 54, 56, 58 are rotated to locate their shortest or zero number gage pins of zero effective length in gaging position. This is accomplished by rotating each thimbal to a position wherein the gage pin number zero on the thimbal registers with the corresponding reference dart 84. The slide 14 is then lowered to a position wherein the slide is supported by those gage pins 24 currently in gaging position and the push rods 76, 78, 80. At this point, the upper push rod set screws 82 are released and the zero adjustment screw 32 is rotated to locate the gage slide 14 in a zero position, wherein the lower end face of the gage bar 48 just contacts the reference surface 40. The set screws 82 are then retightened to fit the upper push rod 76 to the slide.

While these steps may be repeated whenever and as often as desired, normally calibration of the instrument is required only once. After the zero adjustment is completed and the upper push rod 76 secured to the slide 14, each gaging surface 20 on the gage slide 14 is fixed permanently at a precise height above the reference surface 40, and precise repeatability of all measurements made with the gage is assured. The height of each gaging surface is indicated by the inch number opposite the respective surface. The gage abutment spacing $d$ then has an initial value determined by the several gage pin, push rod, and thimbal support dimensions $d_1$ through $d_7$.

The height of the gage slide 14, and hence the height of each of its gaging surfaces 20, may be digitally adjusted upward from the zero setting position to a maximum adjustment range of 0.999 inch. This digital adjustment may occur in 0.1, 0.01, or 0.001 inch steps by selective rotation of the thimbals 54, 56, 58. Thus, rotation of the tenths thimbal 54 to each successive index position adjusts the gage slide height, and hence the height of each gaging surface 20, through the maximum adjustment range in 0.1 inch steps corresponding to the .1 inch digital increments of the gage pin set. Rotation of the hundredths thimbal 56 to its successive index positions adjusts the gage slide height through a total adjustment range of 0.09 inch in 0.01 inch steps. Rotation of the thousandths symbol 58 to its successive index positions adjusts the slide height through a total adjustment range of 0.009 inch in 0.001 inch steps. Adjustment of the height of the gage slide 14 through its maximum adjustment range of 0.999 inch in 0.01 inch steps is accomplished by conjoint adjustment of the tenths and hundredths thimbals 54, 56. Adjustment of the slide height to the maximum adjustment range in 0.001 inch steps is accomplished by conjoint rotation of all three thimbals 54, 56, and 58.

The total height adjustment effected by rotation of any one, two or all three thimbals 54, 56, 58 from their respective zero setting positions to any selected index positions, and hence the height of each gaging surface 20 in its adjusted position above the initial zero setting height of the respective surface, obviously equals the sum of the effective lengths of the gage pins then in gaging position. In this regard, it will be recalled that the effective length of each gage pin is the difference in length in inches of the pin and the shortest or zero gage pin in the respective pin set. This effective length equals the gaging number of the pin multiplied by the decimal order of its pin set. For example, the total height adjustment effected by rotation of the thimbals 54, 56, 58 to their number two number seven, and number five index positions, respectively equals 0.2 plus 0.07 plus 0.005 or 0.275 inches.

In any given position of vertical adjustment of the gage slide 14, the height of a selected gaging surface 20 above the reference surface 40 equals the height of the selected gaging surface above the lower end of the gage bar 48, as indicated by the inch mark opposite the selected gaging surface, plus the effective length of the gage pins currently in gaging position. Assuming the example cited above, for instance, the height of the four inch gaging surface 20 above the reference surface is 4 + 0.275 inches or 4.275 inches. It will now be understood, therefore, that the gage slide 14 may be vertically adjusted through the aforementioned maximum range of 0.999 inches in precise digital increments or steps of 0.1 inch, 0.01 inch, or 0.001 inch by appropriate adjustment of the gage pin thimbals 54, 56, 58. This latter adjustment, in conjunction with the several gaging surfaces 20, permits the present height gage to be set in such a way as to establish any height above the reference surface 40 within the range from one inch to 10.999 inches and in decimal increments or steps of 0.1 inch, 0.01 inch, or 0.001 inch.

What is claimed is:

1. A digital linear adjustment mechanism for a linear gaging instrument comprising:

a pair of gage members joined for relative movement along a given direction line and having abutments respectively located on a common axis parallel to said direction line;

digital adjustment means including a plurality of graduated gage pins of different predetermined lengths and adjustable gage pin holding means on one of said members;

said gage pin holding means comprising a shaft fixed to said one gage member in spaced parallel relation to said common axis, at least two thimbals rotatable and slidable on said shaft, a thimbal support rotatably secured to one end of each thimbal and slidable on said shaft, and means keying said thimbal supports against rotation relative to said shaft, whereby each support is free to slide along but is fixed against turning relative to said shaft;

said gage pins being slidably disposed within bores extending axially through and circumferentially spaced about each thimbal in a manner such that each thimbal contains one set of gage pins and each gage pin seats at one end against the adjacent thimbal support;

said thimbals being rotatable for moving selected gage pins to a gaging position, said gage pins in gaging position being disposed end to end along said common axis, and each thimbal support including a push rod on said common axis for providing a fixed spacing between the gage pins of adjacent pin sets currently in gaging position;

said gage pins of each pin set being graduated in length such that successive pins in each pin set differ in length by a constant digital increment, and the gage pins of the different pin sets vary in length by different selected decimal increments;

means for adjusting one of said gage abutments along said common axis to effect relative adjustment of said gage members along said direction line without altering said abutment spacing; and means for effecting axial separation of the adjacent gage pins in gaging position and said push rods for rotational adjustment of said thimbals to rotate selected gage pins into gaging positions.

2. A digital adjustment mechanism according to claim 8 including:

indexing means for yieldably retaining each thimbal in indexing positions corresponding to the gaging positions of its respective gage pins, and markings on each thimbal and thimbal support to indicate the effective decimal length of each gage pin.

3. A digitally adjustable linear height gage comprising:

a pair of gage members having parallel gaging surfaces;

one of said gaging members comprising a base member having a base surface providing one of said gaging surfaces and adapted to rest on a reference surface, the other gaging member comprising a vertically adjustable slide on said base member having at least one gaging surface parallel to said base surface and adjustable in height relative to said base surface and adjustable in height relative to said base surface by vertical adjustment of said slide;

a pair of abutments on said members disposed on a common axis; and digital adjustment means including a plurality of graduated pins of different predetermined lengths and adjustable holding means on one of said gaging members supporting said gage pins for selective movement to a gaging position between said abutments on said common axis;

said gage pin holding means comprising a shaft fixed to said base member in spaced parallel relation to said common axis and at least two thimbals slidable and rotatable on said shaft, said gage pins being spaced circumferentially about and parallel to the rotation axis of said thimbals;

said thimbals being rotatable on said shaft to selectively locate their respective gage pins in said gaging position and slidable along said shaft to effect separation of the thimbals and gage pins; and co-acting means on said thimbals and one of said gage members for effecting relative axial movement of said thimbals along said shaft to separate the thimbals and gage pins for rotational adjustment of each thimbal upon upward vertical adjustment of said slide relative to said base member.

4. The height gage according to claim 3 wherein:

said slide comprises a gage bar parallel to said direction line having a number of uniformly spaced parallel gaging surfaces normal to said direction line.

5. A digitally adjustable linear height gage comprising:

a pair of gage members having parallel gaging surfaces, one of said gage members comprising a base member having a base surface providing one of said gaging surfaces and adapted to rest on a reference surface, and the other gage member comprising a vertically adjustable slide on said base member having at least one said gaging surface parallel to said base surface and adjustable in height relative to said base surface by vertical adjustment of said slide;

means joining said gage members for relative movement along a direction line normal to said gaging surfaces;

a pair of abutments on said gage members, said abutments being disposed on a common axis parallel to said direction line;

digital adjustment means including a plurality of graduated gage pins of different predetermined lengths, and adjustable holding means on one of said gage members supporting said gage pins for selective movement to a gaging position, at which gaging position the selected pin is disposed endwise between said abutments on said common axis to establish a precise predetermined spacing between said abutments and between said gaging surfaces;

said gage pin holding means comprising a shaft fixed to said base member spaced parallel relation to said common axis, at least two thimbals rotatable and slidable on said shaft, a thimbal support rotatably secured to the lower end of each thimbal and slidable on said shaft, and means keying said thimbal supports against rotation relative to said shaft, whereby each support is free to slide along but is fixed against turning relative to said shaft;

said gage pins being slidably disposed within bores extending axially through and circumferentially spaced about each thimbal in a manner such that each thimbal contains a set of gage pins and the lower end of each gage pin seats against the adjacent thimbal support;

said gage pins in gaging position being disposed end to end along said common axis and each thimbal support including a push rod on said common axis engaging and providing a fixed spacing between the adjacent gage pins of adjacent pin sets currently in gaging position;

said gage pins of each pin set being graduated in length such that successive pins of each pin set differ in length by a constant digital increment and the gage pins of the different pin sets vary in length by different selected decimal increments;

means for adjusting one of said gage abutments along said common axis to effect relative adjustment of said slide and base member along said direction line without altering said abutment spacing; and means for effecting axial separation of the adjacent gage pins in gaging position and said push rods to permit rotational adjustment of said thimbals.

6. A digital linear adjustment mechanism for a linear gaging instrument comprising:

a pair of gage members joined for relative movement along a give direction line and having abutments respectively located on a common axis parallel to said direction line;

first and second sets of graduated gage pins of different relative lengths;

a shaft fixed to one of said gage members in spaced parallel relation to said common axis;

first and second thimbals for holding said first and second sets of gage pins respectively, said thimbals being movably mounted on said shaft independently of each other, said gage pins being circumferentially spaced about and parallel to said shaft, said thimbals being relatively slidable along said shaft to effect separation of the thimbals and independently rotatable on said shaft to selectively locate their gage pins in gaging position, the gage pins currently in gaging position being disposed along said common axis;

means for axially separating said abutments for permitting selective positioning of said gage pins therebetween in gaging position and thereafter moving said abutments together for predetermined separation in accordance with the length of such selected gage pins; and co-acting means provided on said thimbals and one of said gage members for effecting relative axial movement of said thimbals along said shaft to separate the thimbals for rotational adjustment of each thimbal upon relative movement of said gage members and abutments away from one another along said direction line.

7. A digital adjustment mechanism according to claim 6 including:

indexing means for yieldably retaining said thimbals in indexing positions corresponding to the gaging positions of said gage pins.

8. A digital linear adjustment mechanism for establishment of a linear distance comprising:

a first gage member having a gaging surface;

a second gage member having a gaging surface, said second gage member being mounted on said first gage member and being movable thereon in a first direction with respect to said first gage member so as to change the distance between said gaging surfaces;

a first abutment on said first gage member and a second abutment on said second gage member, said abutments lying along a line parallel to said first direction;

an axis parallel to said line, first and second thimbals each rotatably mounted for rotation about said axis, each of said thimbals carrying a plurality of graduated gage pins of predetermined length difference, said thimbals being rotatable about said axis to bring selected pins onto said line between said abutments; and spacers of fixed lengths between at least some of said pins along said line so that said spacers and said pins on said line engage in end-to-end engagement and engage with said abutments on said gage members to establish the linear position of said second gage member with respect to said first gage member, in accordance with the selected graduated pins.

9. The digital linear mechanism of claim 8 wherein:

said thimbals are axially movable along said axis so that, when said abutments are separated, said thimbals are separable for rotation of said thimbals to rotate different selected ones of said pins onto said line.

10. The digital linear adjustment mechanism of claim 9 wherein:

stops are positioned on said second gage member so that, upon motion of said second gage member to move said abutments away from each other, said stops engage said thimbals to move said thimbals away from each other to permit rotation thereof.

11. The digital linear adjustment mechanism of claim 10 wherein:

said axis is defined by a shaft mounted upon said first gage member, and said thimbals are rotatably and slidably mounted upon said shaft, said stops on said second gage member engaging said thimbals to slide said thimbals along said shaft when said second gage member is moved with respect to said first gage member.

12. The digital linear adjustment mechanism of claim 8 wherein:

said pins are removably mounted in said thimbals, and said pins in each of said thimbals are related to each other by known differences in overall length.

13. The digital linear adjustment mechanism of claim 12 wherein:

said pins define the distance between said abutments by end-to-end engagement.

14. The digital linear adjustment mechanism of claim 11 wherein:

said pins are removably mounted in said thimbals, and said pins in each of said thimbals are related to each other by known differences in overall length.

* * * * *